US012391230B2

(12) United States Patent
Beaulieu et al.

(10) Patent No.: US 12,391,230 B2
(45) Date of Patent: Aug. 19, 2025

(54) DUAL-CONTROL ELECTRO-PNEUMATIC FOOT BRAKE SYSTEM AND METHOD

(71) Applicant: Bendix Commercial Vehicle Systems LLC, Avon, OH (US)

(72) Inventors: Jeremy Beaulieu, Avon, OH (US); Anthony M. Pitts, Avon Lake, OH (US); David W. Howell, Oak Ridge, NC (US); Alexander J. Augoustidis, Avon Lake, OH (US); Chitti Kolli, Avon, OH (US)

(73) Assignee: Bendix Commercial Vehicle Systems LLC, Avon, OH (US)

( * ) Notice: Subject to any disclaimer, the term of this patent is extended or adjusted under 35 U.S.C. 154(b) by 436 days.

(21) Appl. No.: 18/072,270

(22) Filed: Nov. 30, 2022

(65) Prior Publication Data

US 2024/0174208 A1    May 30, 2024

(51) Int. Cl.
*B60T 13/26* (2006.01)
*B60T 7/04* (2006.01)
*B60T 13/24* (2006.01)
*B60T 13/68* (2006.01)

(52) U.S. Cl.
CPC ............ *B60T 13/683* (2013.01); *B60T 7/042* (2013.01); *B60T 13/241* (2013.01); *B60T 2220/04* (2013.01)

(58) Field of Classification Search
CPC .... B60T 15/045; B60T 15/046; B60T 13/683; B60T 2220/04; B60T 7/042
USPC .......................................................... 303/2
See application file for complete search history.

(56) References Cited

U.S. PATENT DOCUMENTS

| | | | | |
|---|---|---|---|---|
| 3,943,795 A | * | 3/1976 | Kenney .................... | G05G 1/34 74/562.5 |
| 5,036,961 A | * | 8/1991 | Eberling ................ | B60T 13/662 303/2 |
| 2005/0218719 A1 | * | 10/2005 | Hatipoglu ............. | B60T 15/045 303/188 |
| 2009/0236904 A1 | * | 9/2009 | Ripley .................. | B60T 13/662 303/122.15 |
| 2012/0080935 A1 | * | 4/2012 | Steinberger ........... | B60T 8/3675 303/2 |
| 2013/0320751 A1 | * | 12/2013 | Eberling ................ | B60T 7/042 303/14 |
| 2020/0331442 A1 | | 10/2020 | Cheon et al. | |
| 2021/0284117 A1 | * | 9/2021 | Boulivan ................ | B60T 8/176 |

(Continued)

FOREIGN PATENT DOCUMENTS

CN          201872741 U      6/2011

OTHER PUBLICATIONS

"BVA-85™ Brake Valve Actuator"; Bendix product brochure; Bendix Commercial Vehicle Systems LLC; 2005; 2 pages.

*Primary Examiner* — Bradley T King
(74) *Attorney, Agent, or Firm* — Crowell & Moring LLP (57) ABSTRACT

A dual-control electro-pneumatic foot brake system and method are provided for use with a vehicle having multiple foot brake modules that communicate electronic signals to an electronic brake controller. As a backup feature in case there is a problem with the electron braking system, one of the foot brake modules provides pneumatic pressure to the other foot brake module, which supplies the provided pneumatic pressure to various components of the vehicle's braking system. Other alternatives are provided.

18 Claims, 13 Drawing Sheets

(56) References Cited

U.S. PATENT DOCUMENTS

| | | | | |
|---|---|---|---|---|
| 2021/0323523 A1* | 10/2021 | Adler | ................. | B60T 8/94 |
| 2022/0118959 A1* | 4/2022 | Johnson | ................. | B60T 15/046 |
| 2024/0034284 A1* | 2/2024 | Hurley | ................. | B60T 17/221 |
| 2024/0034285 A1* | 2/2024 | Cochran | ................. | B60T 7/20 |
| 2024/0198988 A1* | 6/2024 | Jiang | ................. | B60T 7/06 |

* cited by examiner

DUAL-CONTROL ELECTRO-PNEUMATIC FOOT BRAKE SYSTEM AND METHOD

BACKGROUND

Some vehicles are built with two driving positions, where both the traditional driver side and the traditional passenger side of the vehicle contain a steering wheel, acceleration pedal, and brake pedal. One example of such a vehicle is a commercial garbage truck, where the two-driving-position design is integrated into the truck by an original equipment manufacturer (OEM). The two-driving-position design allows the driver to choose which side of the truck to drive from. With this flexibility, the driver can choose to operate the truck on whichever side is closer to the curb to make it easier for the driver to get out of the truck and pick up refuse. Other vehicles, such as multi-axle emergency vehicles, may include a second brake pedal located outside of the cab. In a purely-pneumatic anti-lock braking system (ABS), each brake pedal is connected to a pneumatic foot brake valve, and a pneumatic check valve selects the higher pressure supplied by the two pneumatic foot brake valves to apply to the braking system.

SUMMARY

In one embodiment, a braking sub-system is provided for use in a vehicle comprising first and second foot brake assemblies. The braking sub-system comprises a brake valve actuator coupled with a first foot brake assembly. The first foot brake assembly comprises a first pedal and a first valve, and the first valve is configured to apply pneumatic pressure to a braking system of a vehicle in response to actuation of the first pedal. The brake valve actuator is pneumatically coupled with a second foot brake assembly comprising a second pedal and a second valve, the second valve being configured to apply pneumatic pressure to the brake valve actuator in response to actuation of the second pedal. The brake valve actuator is configured to open the first valve in the first foot brake assembly to apply pneumatic pressure to the braking system of the vehicle in response to receiving pneumatic pressure from the second foot brake assembly.

DETAILED DESCRIPTION

As mentioned above, some vehicles are built with two driving positions, where both the traditional driver side and the traditional passenger side of the vehicle contain a steering wheel, acceleration pedal, and brake pedal. One example of such a vehicle is a commercial garbage truck, where the two-driving-position design is integrated into the truck by an original equipment manufacturer (OEM). The two-driving-position design allows the driver to choose which side of the truck to drive from. With this flexibility, the driver can choose to operate the truck on whichever side is closer to the curb to make it easier for the driver to see the curb and the garbage and/or to get out of the truck and pick up refuse. In a purely-pneumatic anti-lock braking system (ABS), each brake pedal is connected to a different/separate pneumatic foot valve, and a pneumatic check valve selects the higher pressure supplied by the two pneumatic foot brake valves to apply to the braking system.

While purely-pneumatic anti-lock braking systems (ABSs) are currently popular in North America, electronic braking systems (EBSs) are popular in Europe and are gaining in global popularity. An EBS, which is sometimes referred to as a "brake by wire" system, can provide a number of advantages over an ABS. In general, because an EBS uses electronic signals instead of pneumatic signals, an EBS can provide more precise, nuanced control of brakes as compared to an ABS. As compared to a pneumatic signal, an electronic signal is significantly faster (thus, can reduce braking response time and braking distance) and can provide additional information about the vehicle (e.g., from various sensors at each wheel) that can be relevant to a brake controller in braking the vehicle. Also, an EBS system can provide better capability for higher levels of autonomous driving functionality.

Figure 1:
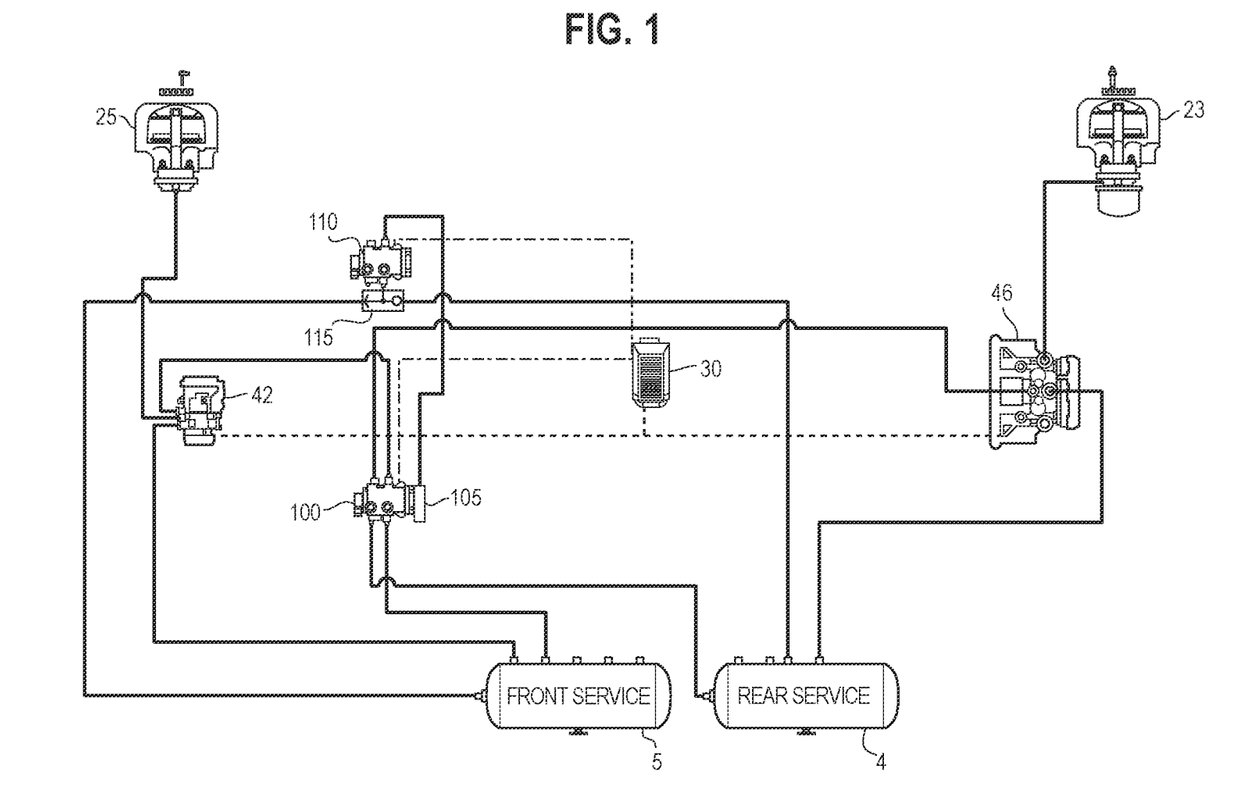
FIG. 1 is a diagram of a braking system of an embodiment having a dual-circuit foot brake module with only the primary circuit connected.

Turning now to the drawings, FIG. 1 is a block diagram of a braking system of a vehicle of an embodiment. To simplify the drawings, many components of the braking and other systems have been removed. In this embodiment, the vehicle is a tractor that has a rear drive axle, a front undriven (steer) axle (more than one steer axle can be used), and one or more optional axles (there can be zero additional axles, where the vehicle has a total of only two axles). The rear drive axle is driven by a drivetrain, which can include one or more of the following components: gas-powered motor(s), electric motor(s), batteries, transmission(s), differential(s), locking differential(s), and other such gear sets capable of changing rotational speeds. The number and location(s) of the motor(s) in the drivetrain can be selected in any suitable manner. While the vehicle in this example is a tractor that can tow a trailer, other vehicles (e.g., a garbage truck) can be used. Also, it should be noted that the details shown in FIG. 1 are just examples and that other configurations are possible.

As mentioned above, in this embodiment, two foot brake modules are used: a first foot brake module 100 and a second foot brake module 110. The first foot brake module 100 can be considered the dominant module and can be mounted in a location to receive the most use by the vehicle operator under normal operating conditions. For example, in a vehicle built for use in the United States, the first foot brake module 100 can be located on the left side of the vehicle, which is the traditional driver's position. The second foot brake module 110 can be mounted in an alternate position that would receive secondary use, such as the right side of the vehicle, which is the traditional passenger's position. The locations of the first foot brake module and second foot brake module may be changed depending on the vehicle manufacturer and ultimate end use of the vehicle. In one embodiment, the second foot brake module 110 can be mounted to a firewall with its pneumatic supply and exhaust ports oriented external to the vehicle and its pneumatic delivery inside of the vehicle. While two foot brake modules are shown in this example, it should be understood that fewer or more foot brake modules can be used, with the appropriate modifications. As used herein, a "foot brake module" is an assembly that comprises a brake pedal (or other type of actuator), one or more sensors that measure how much stroke a driver indicates by pressing the brake pedal and transmit electronic signals representing that displacement, which represents a driver brake demand, and a valve that selectively opens to apply pneumatic pressure in response to actuation of the brake pedal. Brake pedal types include suspended pedals, where the valve is mounted above the pedal, and treadles, which pivot directly on the valve mounted below the treadle. Other brake pedal and valve combinations and variations are contemplated. The phrase "foot brake assembly" is used herein to refer to an assembly of components, which can include some or all of the above-mentioned components as well as other components.

In one embodiment, the foot brake module contains two sensors, one that increments up and one that increments down as the brake pedal is pressed. These two opposing signals can be used as an error detection mechanism, as a controller can detect an error if the two signals it receives from the foot brake module are not opposing. Also, in one embodiment, the foot brake module generates a signal even when the brake pedal is not pressed (such signal would represent zero braking). That way, if a controller receives no signal whatsoever from the foot brake module, the controller can assume there is a fault or error in the foot brake module or communication channel (which, in one embodiment, is a direct, point-to-point communication channel, such as a universal asynchronous receiver-transmitter (UART) link). As mentioned above, in addition to providing electrical signals, the foot brake controller can also provide a pneumatic signal, which will be discussed in more detail below In one embodiment, the signals from the first and second foot brake modules 100, 110 are sent to a controller 30. The controller 30, which is sometimes referred to herein as an "electronic control unit (ECU)" or a "central ECU (CECU)," can take any suitable form, such as a (micro-) processor that executes computer-readable program code (e.g., firmware) stored in a computer-readable medium (e.g., in the controller or in another location). A controller can also take the form of a pure-hardware configuration using processing circuitry, logic gates, switches, an application-specific integrated circuit (ASIC), or a programmable logic controller, for example. The firmware and/or hardware of a controller can be configured to perform the various functions described below and shown in the flow diagrams.

In operation, when the controller 30 receives the electronic brake demand signals from the first and second foot brake modules 100, 110, the controller 30 can select the signals from one of those modules 100, 110 (as discussed below) and map the signals representing the pedal displacement of the selected module to a requested deceleration and commands electro-pneumatic modules (EPMs) 42, 46 on the undriven and driven axles to apply the appropriate amount of pressure needed to achieve that deceleration given various variables, such as, but not limited to, vehicle weight, weight distribution, whether a trailer is present, and driving conditions. In an EBS, relays and modulators on an axle can be combined into an EPM, which is capable of electronically applying, holding, and releasing air to decelerate a wheel end of the axles. The EPMs 42, 46 can cause the vehicle to decelerate in any suitable way. For example, in the embodiment shown in FIG. 1, the EPM 46 on the drive axle is a two-channel EPM and communicates air disc calipers 23 on the braked wheel end of the drive axle. The EPM 42 on the undriven axle in this example is a one-channel EPM that communicates with air disc calipers 25 on the braked wheel end of the undriven axle. Rear and front service reservoirs 4, 5 can provide proportional pneumatic pressure to the EPMs 42, 46.

As mentioned above, in this embodiment, the electronic brake controller 30 accepts electronic input signals from both foot brake modules and selects which signals to use (e.g., the greater signal). Alternatively, if the controller 30 does not accept electronic input signals from more than one foot brake module, an arbitration mechanism outside of the controller 30 can be used, such that the arbitration mechanism provides the controller 30 with the selected signal. For example, multiple brake controllers can be used, wherein one of the brake controllers receives signals from both foot brake modules and applies the greater signal to the braking system. As another example, a stand-alone switch box can be used to receive signals from the two foot brake modules, select one of the signals, and send the selected signal to the controller. As yet another example, the switch box can be part of one of the foot brake modules instead of a stand-alone device. Additional information about these examples can be found in U.S. patent application Ser. Nos. 17/877,347; 17/877,313; and Ser. No. 17/877,272; which were filed on Jul. 29, 2022 and are each incorporated herein by reference. It is important to note that these are merely examples, and other implementations can be used.

Returning to FIG. 1, this embodiment contains a failsafe feature to provide a pneumatic backup to the second foot brake module 110 in the event of a failure in the electronic braking system. More specifically, in some environments, the first brake module 100 is the main brake module of the braking system in that it is connected electrically to the electronic brake controller 30 and also pneumatically to the various braking components of the braking system. In normal operation, the various braking components would be controlled by electronic signals from the electronic brake controller 30. Those braking components would still receive pneumatic signals from the first brake module 100, but the braking components can ignore those signals in favor of the electronic signals from the electronic brake controller 100. However, if there is a communication or other failure in the electronic braking system, the braking components have the pneumatic signal from the first foot brake module 100 as a backup.

Figure 2:
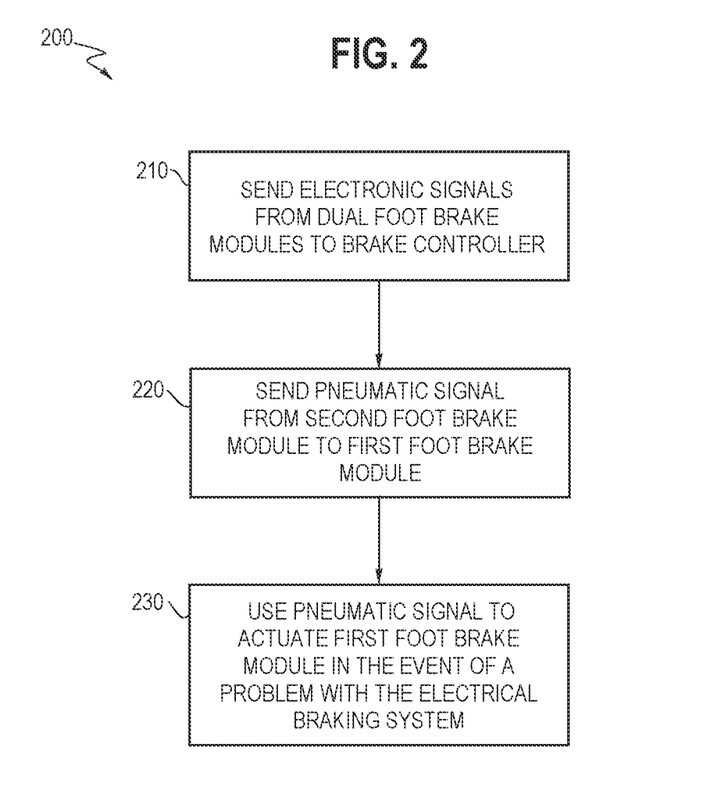
FIG. 2 is a flow chart of a method of an embodiment.

An issue can arise, however, when the second foot brake module 110 is connected only to the electronic brake controller 30 and does not provide pneumatic signals to the various braking components of the vehicle. In that situation, if the driver is operating the vehicle from the side that has the second foot brake module 100 and a fault occurs in the electronic braking system, the driver will not be able to brake the vehicle due to the lack of a backup pneumatic connection from the second foot brake module 100. To address this situation, a brake sub-system can be used that implements the method shown in the flow chart 200 in FIG. 2. As shown in FIG. 2, in this embodiment, the electronic signals are sent from the dual foot brake modules 100, 110 to the electronic brake controller 30 (act 210). Also, a pneumatic signal is sent from the second foot brake module 110 to the first foot brake module 100 (act 220). This pneumatic signal is used to activate the first foot brake module 100 in the event of a problem with the electrical braking system (act 230).

Any suitable brake sub-system can be used to provide this or other functionality. The following paragraphs provide example of several possible implementations. It should be understood that these are merely examples and that other implementations can be used.

Returning to FIG. 1, in one embodiment, a brake valve actuator 105 is coupled with the first foot brake module 100. The brake valve actuator 105 can take any suitable form, such as, but not limited to, a BVA-85™ Brake Valve Actuator by Bendix Commercial Vehicle Systems LLC. The brake valve actuator 105 is coupled to the second foot brake module 110 via a pneumatic communication channel (e.g., tubing, a hose, etc.). In this embodiment, air is provided to the second foot brake module 110 by the rear or front air reservoirs 4, 5, and a select-high valve 115 (which can be integrated or hard mounted) is used to provide air from whichever reservoir 4, 5 contains air under a higher pressure. As shown in FIG. 1, in this example, the second foot brake module 110 is a dual-circuit foot brake module with only the primary (upper) circuit connected.

In operation, when a driver presses the brake pedal of the second foot brake module 110, the second foot brake module 110 provides electronic signals to the electronic brake controller 30, which electronically instructs the various braking components in the vehicle to apply braking pressure in accordance with the electronic signals provided by the second foot brake module 110. Additionally, the second foot brake module 110 provides pneumatic pressure to the brake valve actuator 105, which is configured to open a valve in the first foot brake module 100 to apply pneumatic pressure to the various components of the braking system responsive to that pressure. So, even though the second foot brake module 110 is not directly connected to the various components of the braking system (as is the first foot brake module 110), the second foot brake module 110 indirectly provides the backup pneumatic signals via the brake valve actuator 105. This provides the desired failsafe/backup feature for the second foot brake module 110. So, in this embodiment, a pneumatic foot brake signal can be provided to the brake valve actuator 105, which actuates the first foot brake module 100. In the event that the EBS falls into pneumatic "backup mode," the first foot brake module 100 will be pneumatically piloted by the second foot brake module 110 via the brake valve actuator 105.

Figure 3:
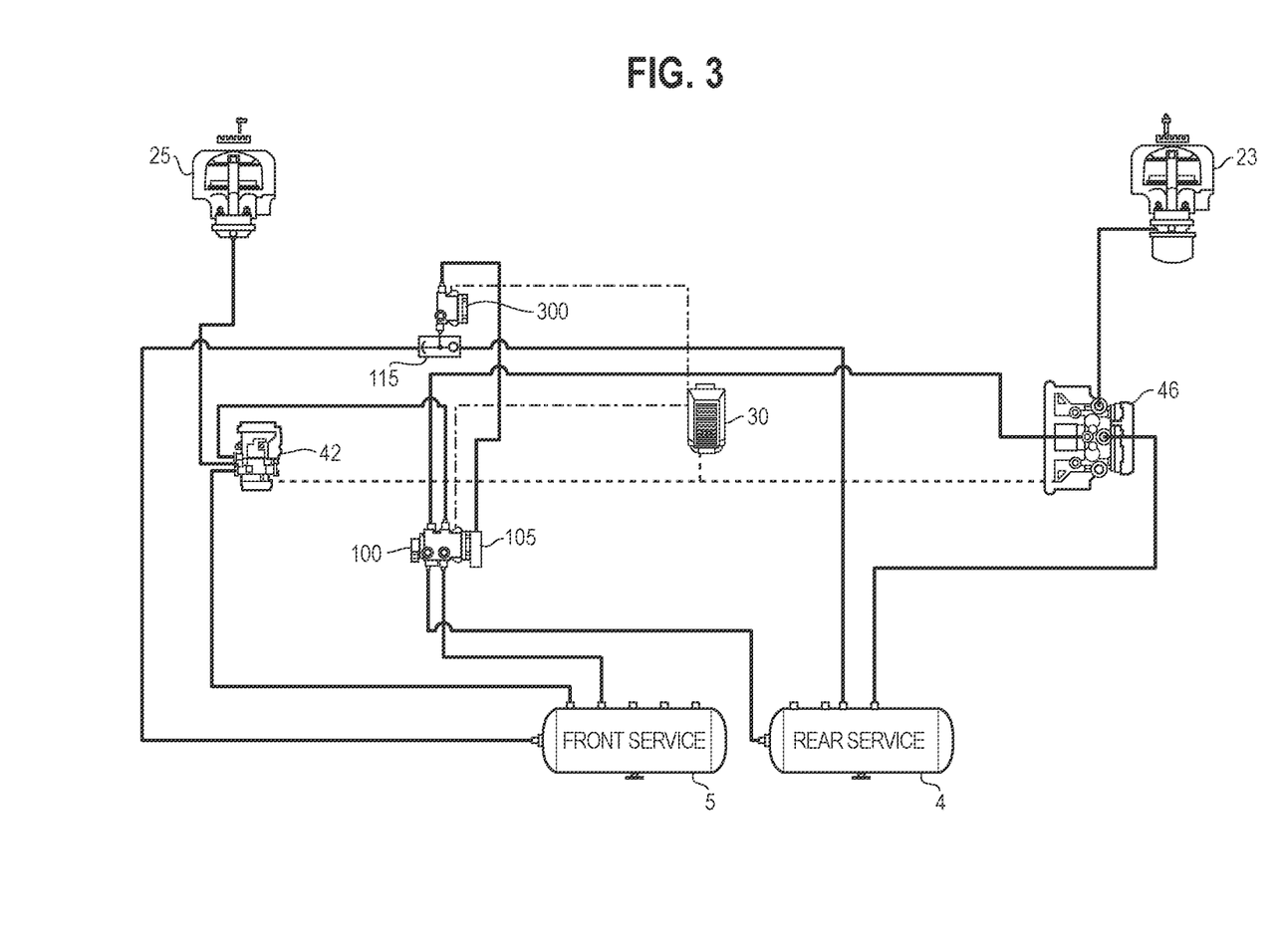
FIG. 3 is a diagram of a braking system of an embodiment having a single-circuit foot brake module.

As noted above, many alternatives can be used. For example, instead of the second foot brake module 110 being a dual-circuit foot brake module with only the primary (upper) circuit connected, as in FIG. 1, a single-circuit foot brake module 300 can be used, as shown in FIG. 3. So, the second foot brake module can be either a single circuit with integrated electronics or a double circuit with no electronics.

Figure 4:
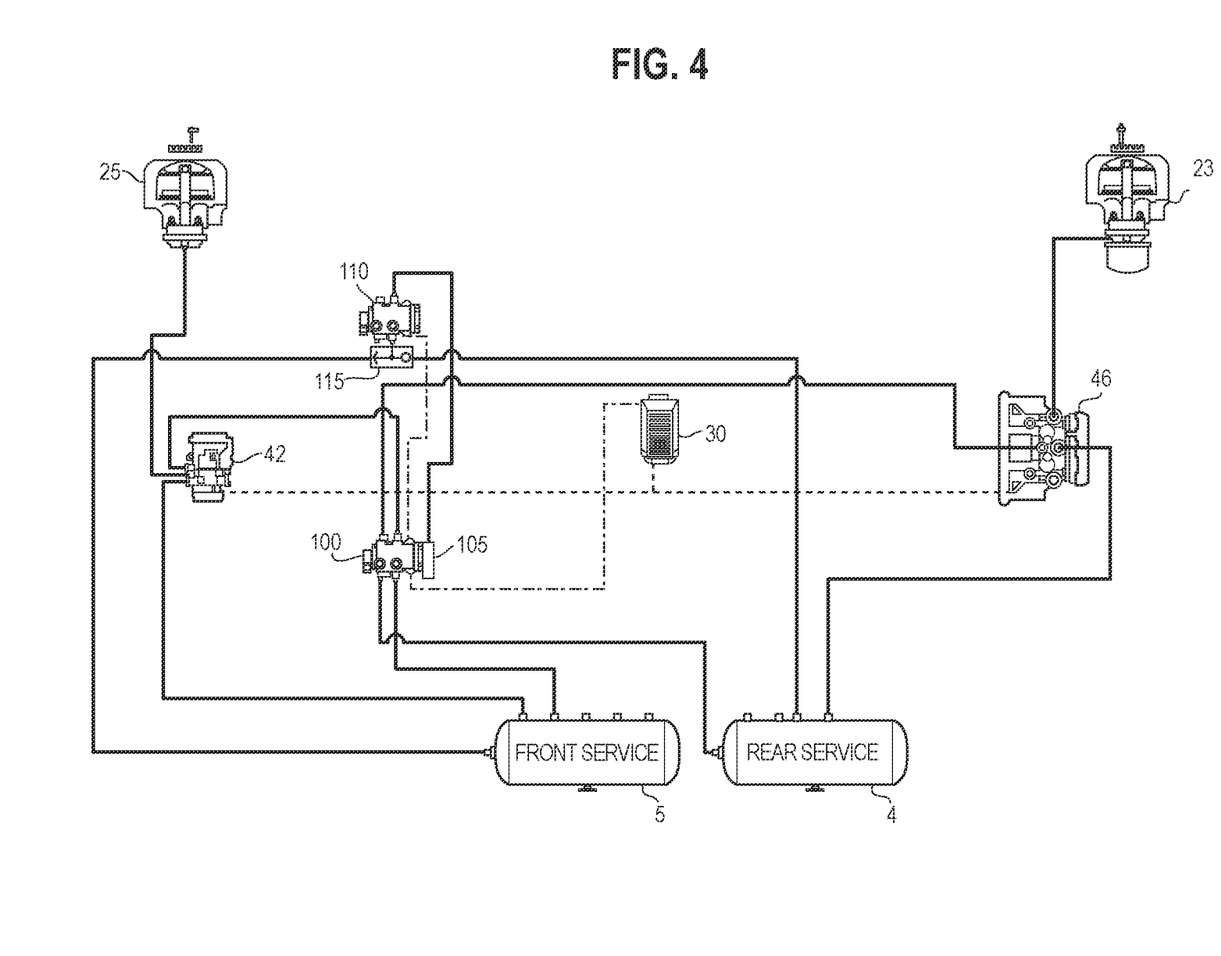
FIG. 4 is a diagram of a braking system of an embodiment in which a second foot brake module indirectly communicates with a brake controller.
Figure 5:
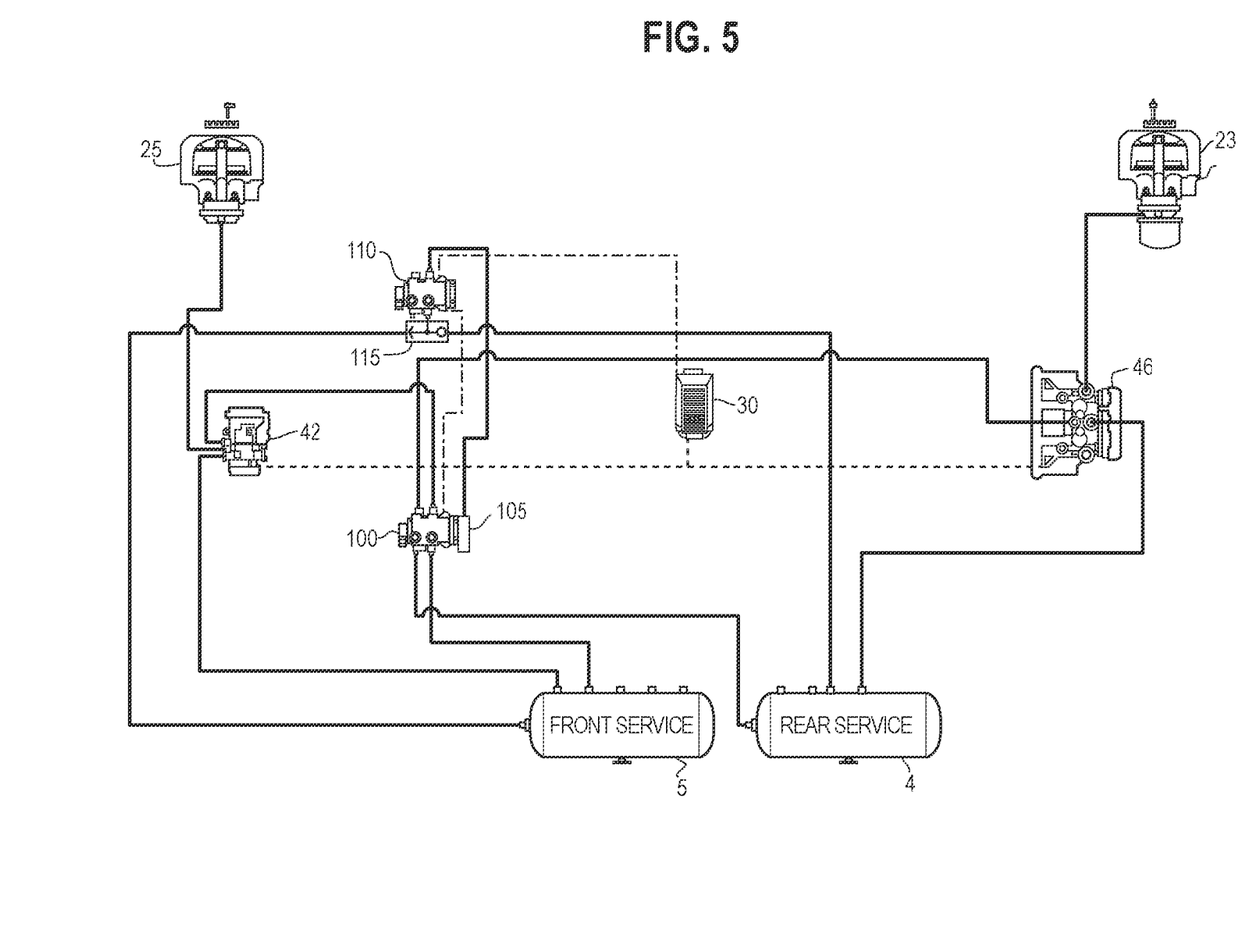
FIG. 5 is a diagram of a braking system of an embodiment in which a first foot brake module indirectly communicates with a brake controller.

Another alternative relates to the electronic communication to the brake controller 30. In the embodiment shown in FIG. 1, the first and second foot brake modules 100, 110 directly communicate electronic signals to the brake controller 30 (e.g., via a digital input/output channel), and the brake controller 30 communicates with the various braking components in the system using a controller area network (CAN). In alternate embodiments, one of the first and second foot brake modules 100, 110 communicates indirectly with the brake controller 30 via the other module 100, 110. For example, in the embodiment shown in FIG. 4, instead of sending electronic braking signals to the brake controller 30, the second foot brake module 110 sends electronic braking signals to the first foot brake module 100, which then sends those signals to the brake controller 30. Conversely, in the embodiment shown in FIG. 5, instead of sending electronic braking signals to the brake controller 30, the first foot brake module 100 sends electronic braking signals to the second foot brake module 110, which then sends those signals to the brake controller 30.

In another alternate embodiment (see FIG. 6), the second foot brake module 400 is a dual-circuit foot brake module and instead of only having the primary (upper) circuit connected (as in the embodiment shown in FIG. 1), both circuits are connected, and a select-high valve 410 (which can be integrated or hard mounted) is used to provide air from whichever one of the pneumatic communication channels provides air under a higher pressure.

Figure 6:
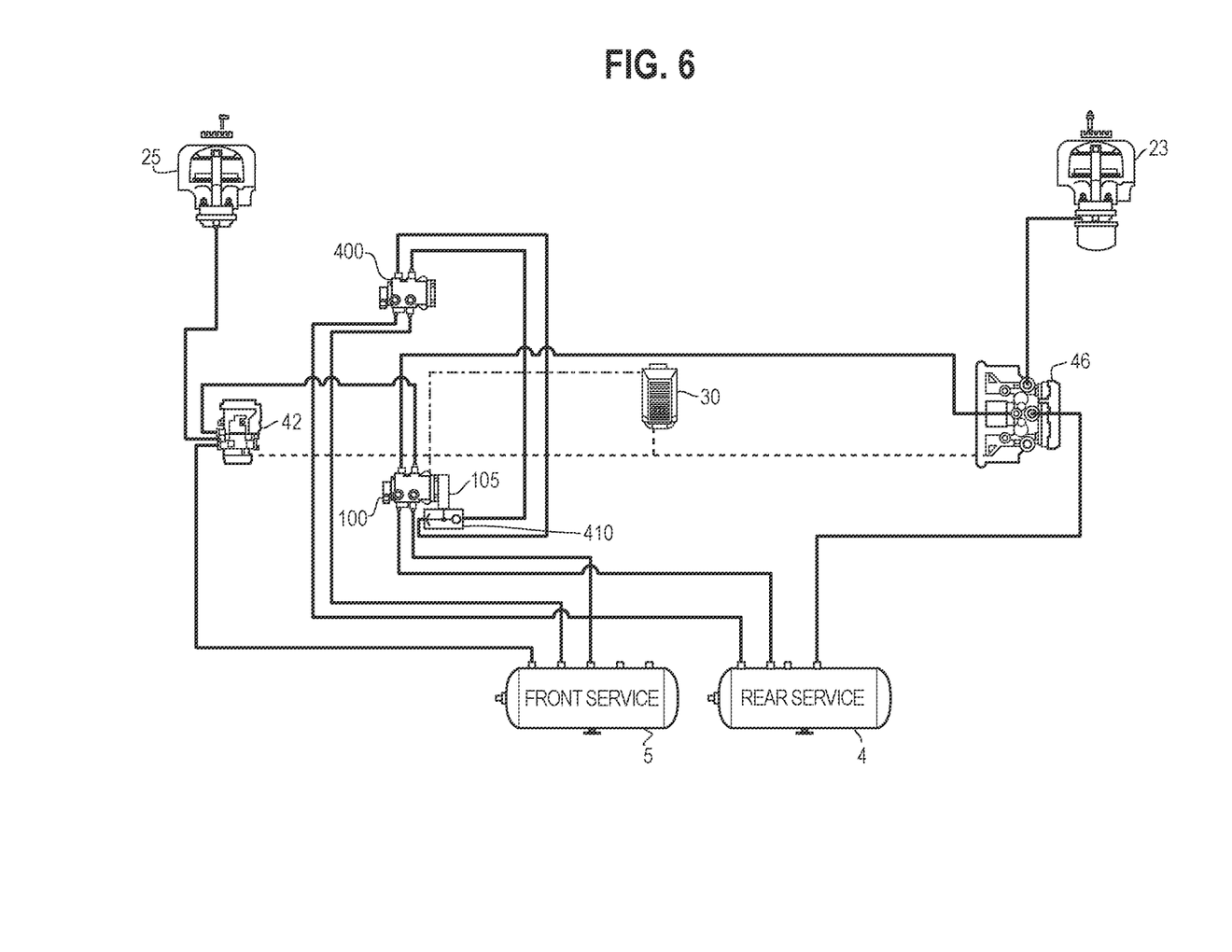
FIG. 6 is a diagram of a braking system of an embodiment having a dual-circuit foot brake module with both circuits connected.
Figure 7:
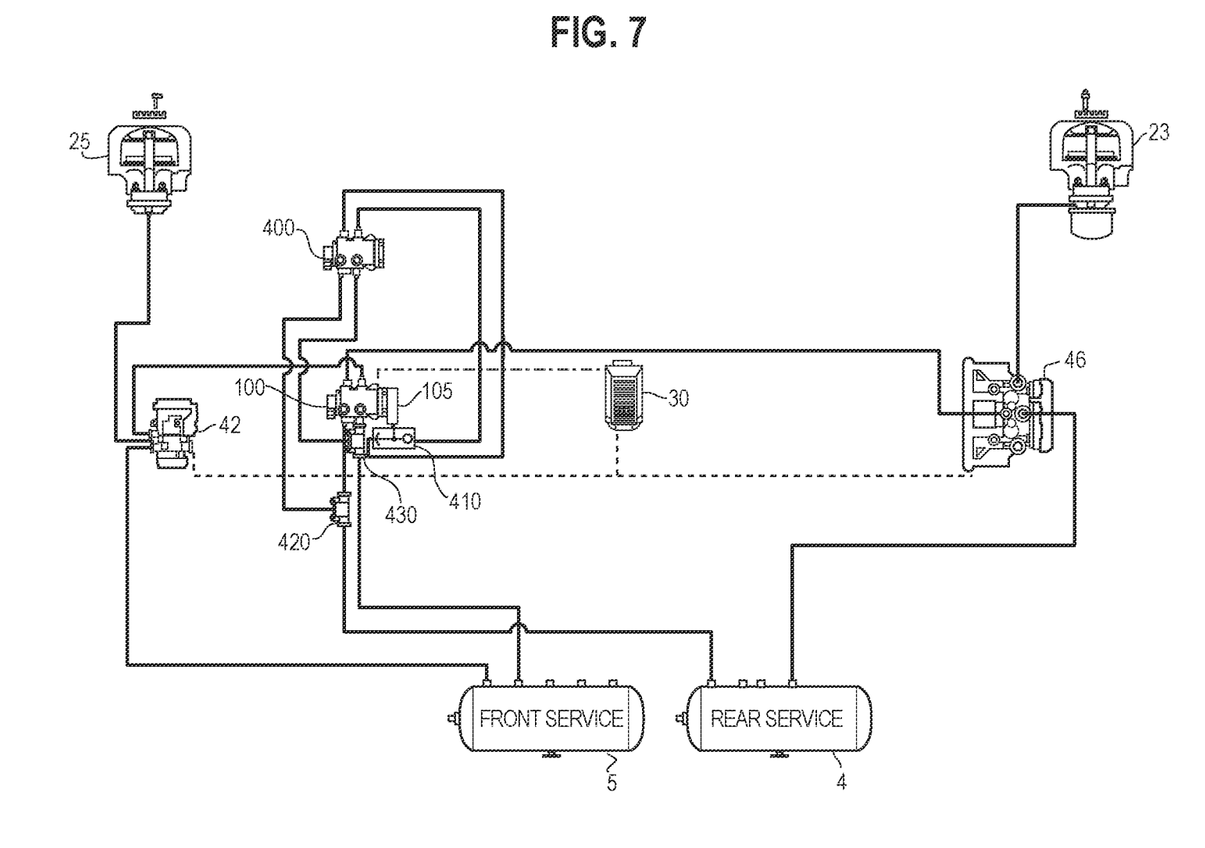
FIG. 7 is a diagram of a braking system of an embodiment in which first and second foot brake modules share pneumatic communication channels.
Figure 8:
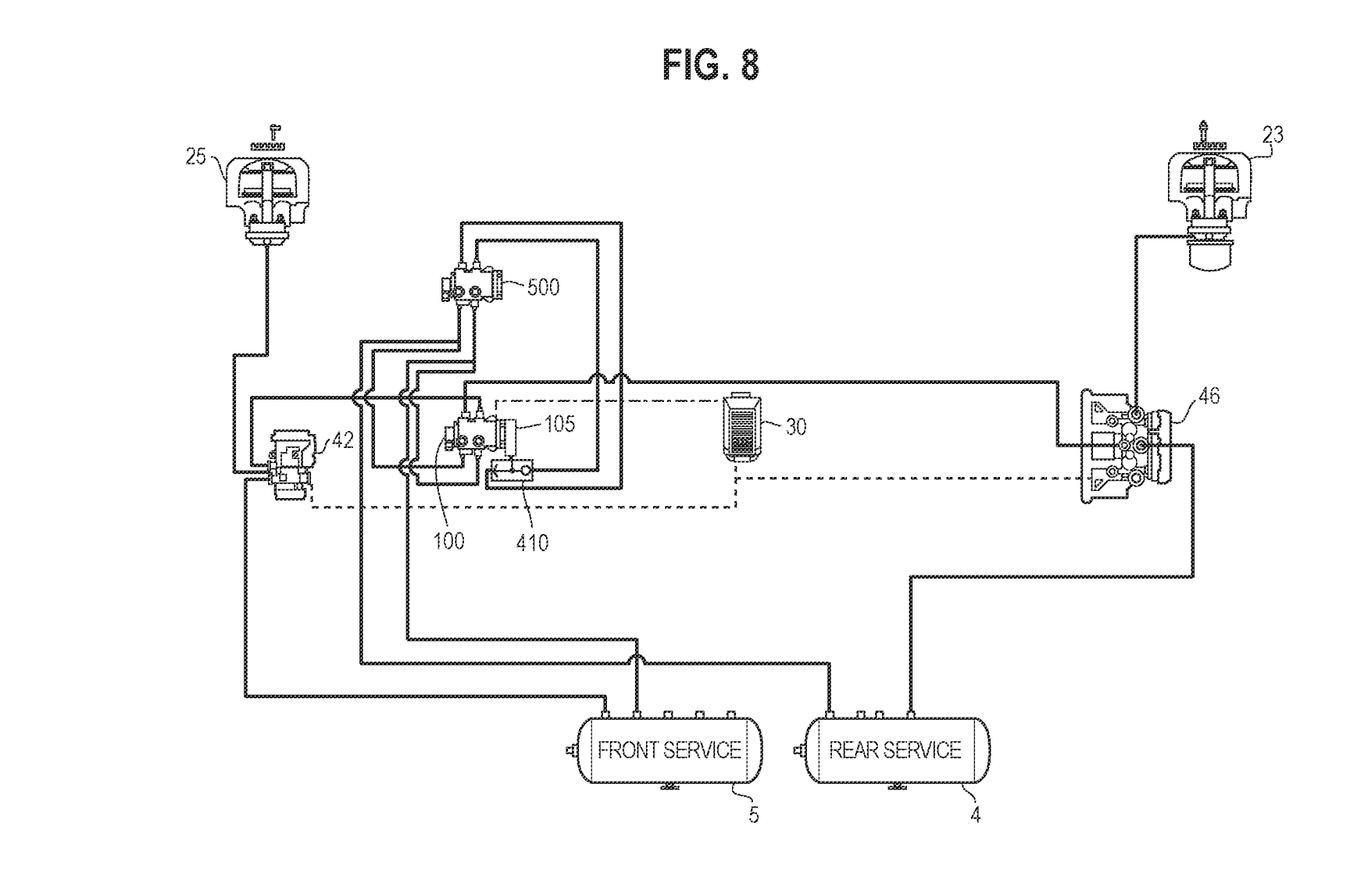
FIG. 8 is a diagram of a braking system of an embodiment in which a second foot brake module supplies air to a first foot brake module.

FIG. 6 shows that both the first and second foot brake modules 100, 400 are provided with air from the rear and front service reservoirs 4, 5 via dedicated pneumatic communication channels. In the alternate embodiment shown in FIG. 7, the first and second foot brake modules 100, 400 are provided with air from the rear and front service reservoirs 4, 5 via shared pneumatic communication channels using pneumatic supply tees 420, 430 (which can be remote or hard mounted to the foot brake modules). In another alternate embodiment (shown in FIG. 8), pneumatic supply lines can be connected to the second foot brake module 500 that features multiple supply ports, such that the second foot brake module 500 supplies air to the first foot brake module 100. The opposite arrangement can also be used.

Figure 9:
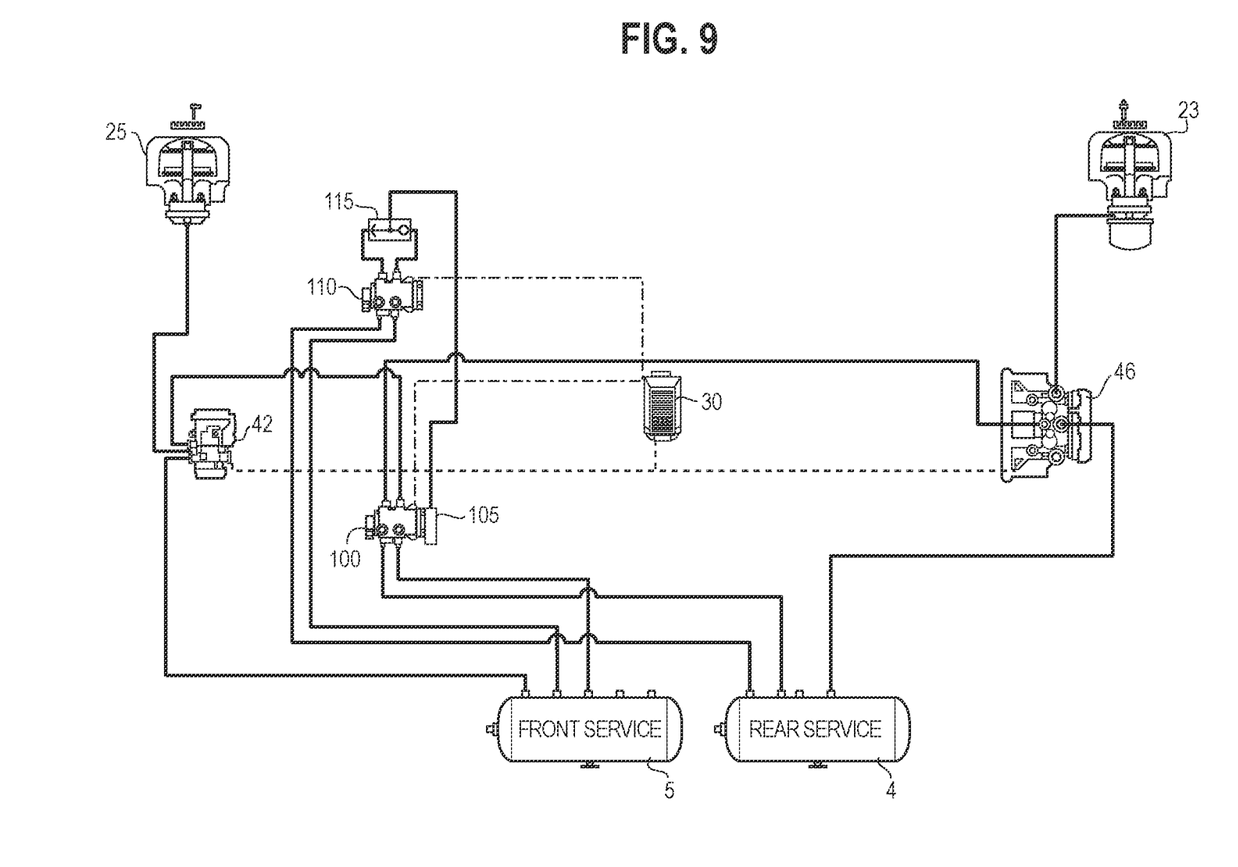
FIG. 9 is a diagram of a braking system of an embodiment in which a select-high valve provides air under higher pressure to a brake valve actuator.
Figure 10:
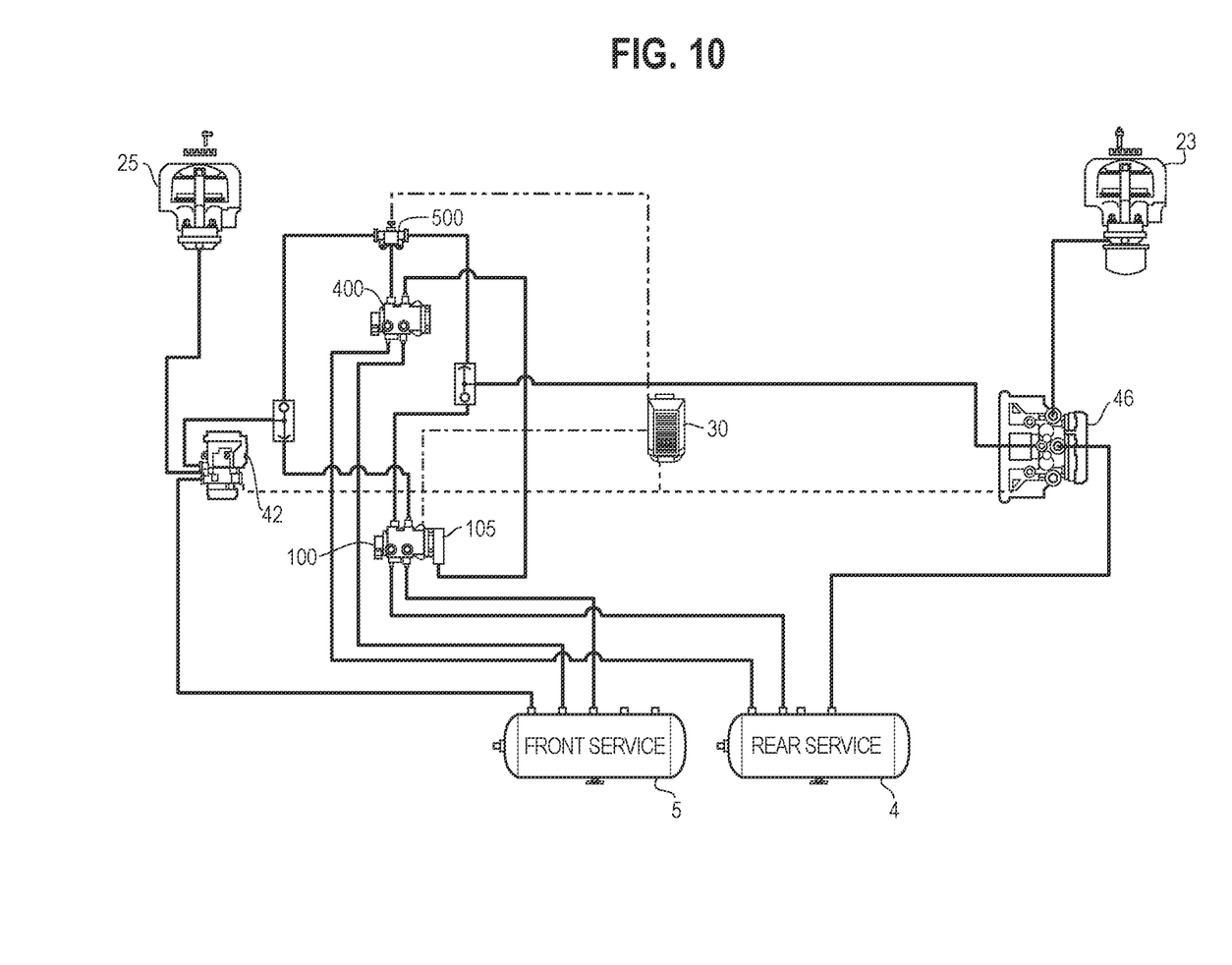
FIG. 10 is a diagram of a braking system of an embodiment in which a pressure transducer provides electrical signals to an electronic brake controller.
Figure 11:
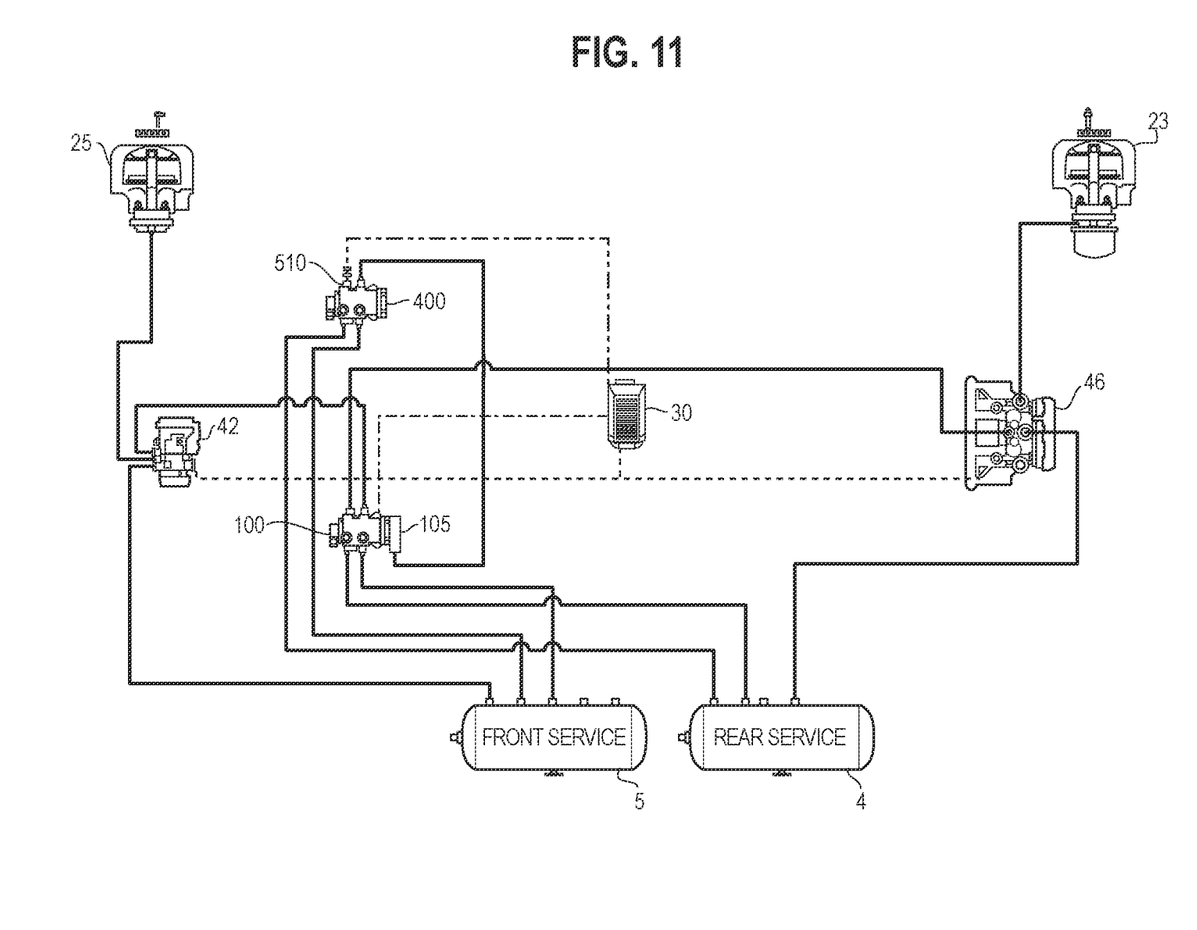
FIG. 11 is a diagram of a braking system of an embodiment in which a pressure transducer is integrated in a second foot brake module.

In yet another alternative (see FIG. 9), the select-high valve 115 receives air from the two output ports of the second foot brake module 110 and provides the air that is under the greater pressure to the brake valve actuator 105. Further, as shown in FIGS. 10 and 11, a pressure transducer 500, 510 can be used to provide electrical signals to the electronic brake controller 30 in response to receiving pneumatic pressure from the second foot brake module 400. In FIG. 10, the pressure transducer 500 is separate from the second foot brake module 400, whereas the pressure transducer 510 is integrated in the second foot brake module 410 in FIG. 11.

Figure 12:
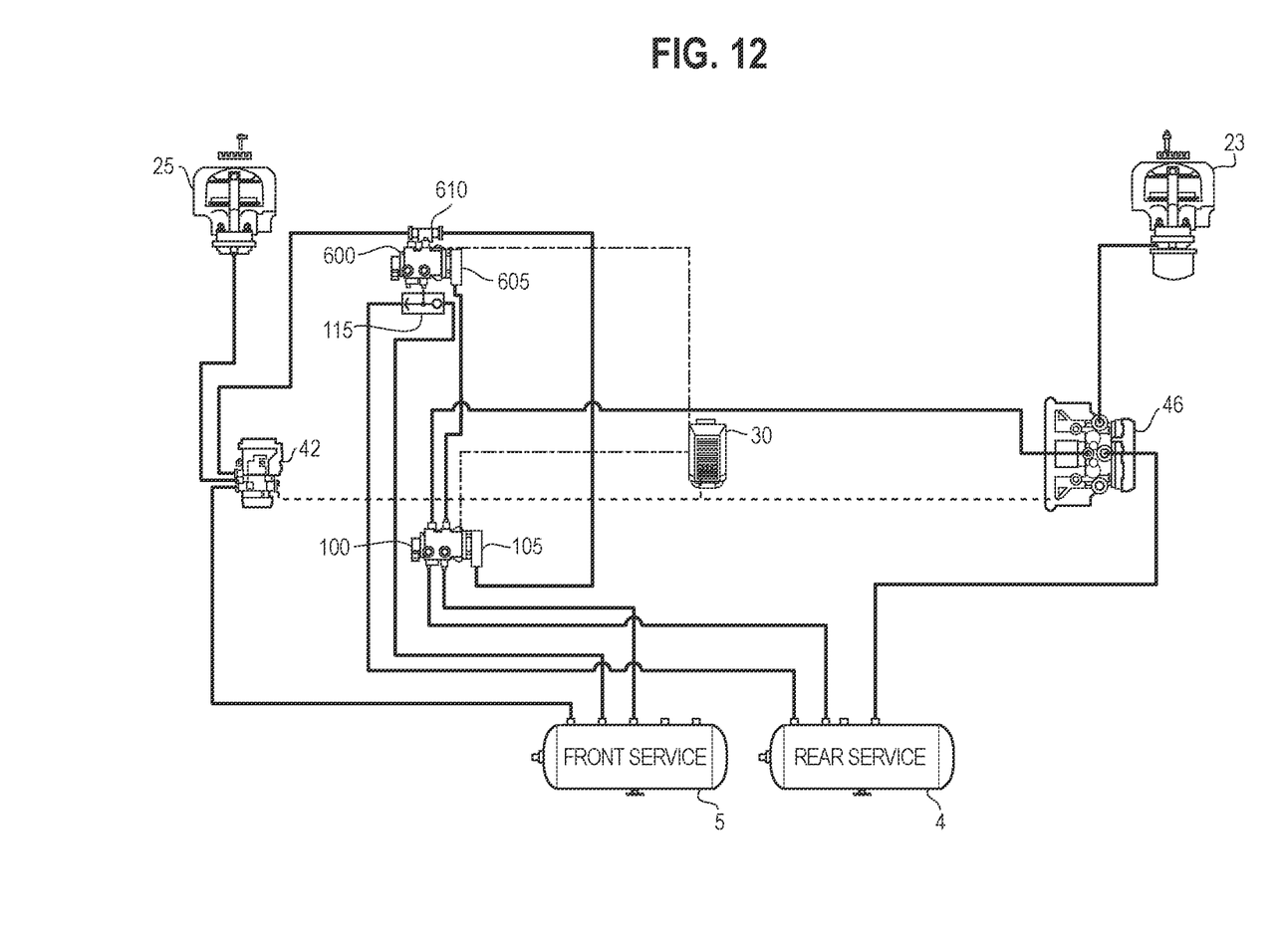
FIG. 12 is a diagram of a braking system of an embodiment in which two brake valve actuators are used.
Figure 13:
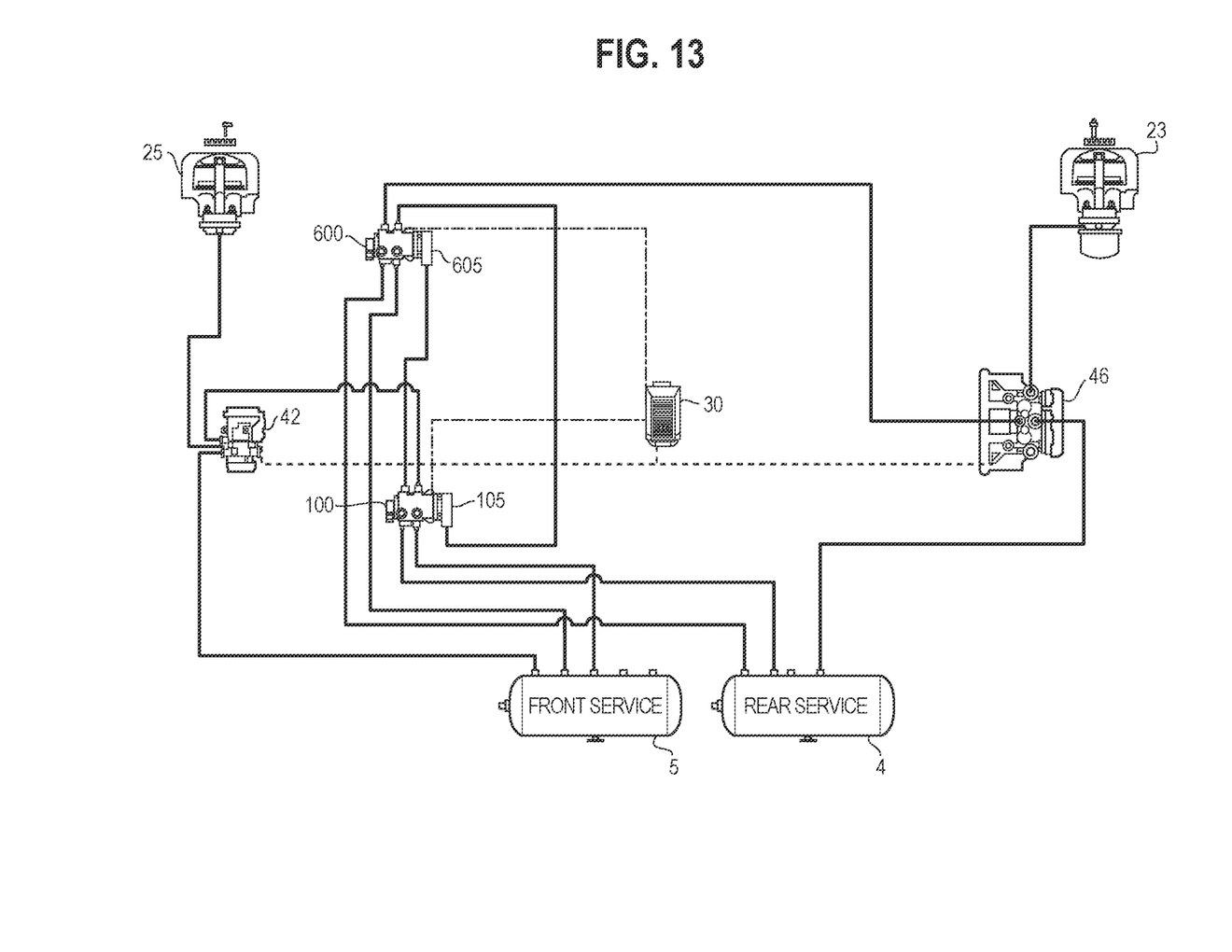
FIG. 13 is a diagram of a braking system of an embodiment in which two brake valve actuators and a dual-connected, dual-circuit foot brake module are used.

In yet another embodiment, multiple brake value actuators are used. For example, in the embodiment shown in FIG. 12, a second brake valve actuator 605 is coupled with the second foot brake assembly 600 and is configured to provide pneumatic pressure to the first brake assembly 110. In this implementation, the output force of the second brake valve actuator 605 is less than the input force to the foot brake module at any given equivalent pressure. In FIG. 12, the second foot brake module 600 is a dual-circuit foot brake module with only the primary (upper) circuit connected. In another alternative (shown in FIG. 13), both circuits are connected.

As seen by these various alternatives, these embodiments can allow for the use of an electronic braking system (EBS) in dual-station vehicles that requires either of the two brake pedals to be operable by the driver. This system can provide the driver with electronic control (with EBS) in normal operation regardless of which pedal is used. For fail-safe conditions (e.g., to provide a backup mode to the EBS), these embodiments can provide service brake control from either pedal. As mentioned above, configurations with this dual control are not traditionally supported by EBS, and these embodiments provide a solution for this problem.

As also seen by these various alternatives, there are multiple ways in which a redundant, dual-control foot brake module sub-system can be provided. For example, a single-circuit electronic foot brake module can be provided having a pedal with the ability to send an electronic signal directly to the EBS to actuate the brakes while the brake controller is operating normally in "electronic mode." In the event that the EBS system falls into pneumatic "backup mode," the double-circuit electronic foot brake module can be pneumatically piloted by the single-circuit electronic foot brake module via the brake valve actuator. As another example, a double-circuit, non-electronic foot brake module for a second foot brake module/pedal can be used. In this example, one circuit of the foot brake module FBM will pneumatically pilot the double-circuit electronic foot brake module using the brake valve actuator. The other circuit can provide a pneumatic control signal to the EPMs. Under normal operation, the electronic foot brake signal can be transmitted by the double-circuit electronic foot brake module regardless of whether it is being depressed or piloted by the second foot brake module. In pneumatic "backup" mode, the pneumatic control signals from either foot brake module can be used to actuate the EPMs. In yet another example, a double-circuit non-electronic foot brake module is provided for a second foot brake module/pedal. Both circuits of this foot brake module can pneumatically pilot the double-circuit electronic foot brake module using the brake valve actuator with a double-check valve integrated or attached to its input.

Under normal operation, the electronic foot brake signal can be transmitted by the double-circuit electronic foot brake module regardless of whether it is being depressed or piloted by the second foot brake module. In pneumatic "backup" mode, the pneumatic control signals from the first foot brake module can be used to actuate the EPMs. There are several advantages associated with these embodiments. For example, the second pedal can be able to take advantage of features offered by EBS electronic pedal control (e.g., adjustable brake force profiles, improved timing, improved accuracy for brake pedal position monitoring, etc.). These embodiments may also require fewer pneumatic hoses or valves to be present inside the dash, which simplifies packaging over existing dual-station brake systems.

It should be understood that all of the embodiments provided in this Detailed Description are merely examples and other implementations can be used. Accordingly, none of the components, architectures, or other details presented herein should be read into the claims unless expressly recited therein. Further, it should be understood that components shown or described as being "coupled with" (or "in communication with") one another can be directly coupled with (or in communication with) one another or indirectly coupled with (in communication with) one another through one or more components, which may or may not be shown or described herein.

It is intended that the foregoing detailed description be understood as an illustration of selected forms that the invention can take and not as a definition of the invention. It is only the following claims, including all equivalents, which are intended to define the scope of the claimed invention. Accordingly, none of the components, architectures, or other details presented herein should be read into the claims unless expressly recited therein. Finally, it should be noted that any aspect of any of the embodiments described herein can be used alone or in combination with one another.

What is claimed is:

1. A braking sub-system for use in a vehicle comprising first and second foot brake assemblies, the braking sub-system comprising:
   a brake valve actuator coupled with a first foot brake assembly, the first foot brake assembly comprising a first pedal and a first valve, wherein the first valve is configured to apply pneumatic pressure to a braking system of a vehicle in response to actuation of the first pedal;
   wherein:
      the brake valve actuator is pneumatically coupled with a second foot brake assembly comprising a second pedal and a second valve, the second valve being configured to apply pneumatic pressure to the brake valve actuator in response to actuation of the second pedal; and
      the brake valve actuator is configured to open the first valve in the first foot brake assembly to apply pneumatic pressure to the braking system of the vehicle in response to receiving pneumatic pressure from the second foot brake assembly.

2. The braking sub-system of claim 1, further comprising a select-high valve positioned between the second foot brake assembly and first and second air reservoirs, wherein the select-high valve is configured to provide air from whichever one of the first and second air reservoirs contains air under a higher pressure.

3. The braking sub-system of claim 1, further comprising an electronic brake controller in electronic communication with the first and second foot brake assemblies, wherein the first and second foot brake assemblies are configured to provide electrical signals to the electronic brake controller in response to actuation of the first and second pedals, respectively.

4. The braking sub-system of claim 3, wherein the first foot brake assembly is further configured to provide electrical signals directly to the electronic brake controller.

5. The braking sub-system of claim 3, wherein the first foot brake assembly is further configured to provide electrical signals to the electronic brake controller indirectly through the second foot brake assembly.

6. The braking sub-system of claim 3, wherein the second foot brake assembly is further configured to provide electrical signals directly to the electronic brake controller.

7. The braking sub-system of claim 3, wherein the second foot brake assembly is further configured to provide electrical signals to the electronic brake controller indirectly through the first foot brake assembly.

8. The braking sub-system of claim 1, further comprising:
   a select-high valve positioned between the first foot brake assembly and a plurality of pneumatic communication channels, wherein the select-high valve is configured to provide air from whichever one of the plurality of pneumatic communication channels provides air under a higher pressure.

9. The braking sub-system of claim 1, wherein the first and second foot brake assemblies are provided with air via dedicated pneumatic communication channels.

10. The braking sub-system of claim 1, wherein the first and second foot brake assemblies are provided with air via shared pneumatic communication channels.

11. The braking sub-system of claim 1, wherein one of the first and second foot brake assemblies is provided with air via the other of the first and second foot brake assemblies.

12. The braking sub-system of claim 1, further comprising:
a select-high valve positioned between the first and second foot brake assemblies and configured to provide air from whichever one of two pneumatic outputs of the second foot brake assembly provides air under a higher pressure.

13. The braking sub-system of claim 1, further comprising:
an electronic brake controller; and
a pressure transducer in communication with the electronic brake controller and the second foot brake assembly, wherein the pressure transducer is configured to provide electrical signals to the electronic brake controller in response to receiving pneumatic pressure from the second foot brake assembly.

14. The braking sub-system of claim 13, wherein the pressure transducer is integrated in the second foot brake assembly.

15. The braking sub-system of claim 1, further comprising a second brake valve actuator coupled with the second foot brake assembly and configured to provide pneumatic pressure to the first foot brake assembly.

16. A method comprising:
performing in a braking system of a vehicle comprising an electronic braking system, a brake valve actuator, and first and second foot brake modules:
providing electronic signals from the first and second foot brake modules to the electronic braking system; and
as a backup to the electronic braking system, using the brake valve actuator to provide a pneumatic signal indirectly from the second foot brake module to braking components in the vehicle via the first foot brake module;

wherein:
the first foot brake module comprises a first pedal and a first valve, wherein the first valve is configured to apply pneumatic pressure to the braking components of the vehicle in response to actuation of the first pedal;
the second foot brake module comprises a second pedal and a second valve, the second valve being configured to apply pneumatic pressure to the brake valve actuator in response to actuation of the second pedal; and
the brake valve actuator is configured to open the first valve in the first foot brake assembly to apply pneumatic pressure to the braking components of the vehicle in response to receiving pneumatic pressure from the second foot brake module.

17. The method of claim 16, wherein at least some of the electronic signals are provided via a pressure transducer.

18. A braking sub-system comprising:
a brake valve actuator;
a first foot brake assembly comprising a first pedal and a first valve wherein the first valve is configured to apply pneumatic pressure to a braking system in a vehicle in response to actuation of the first pedal; and
a second foot brake assembly comprising a second pedal and a second valve, where the second valve is configured to apply pneumatic pressure to the brake valve actuator in response to actuation of the second pedal;
wherein the brake valve actuator is configured to open the first valve in the first foot brake assembly to apply pneumatic pressure to the braking system in response to receiving pneumatic pressure from the second foot brake assembly.

* * * * *